W. Harty.
Forming Carriage Springs.
Nº 113,164. Patented Mar. 28, 1871.
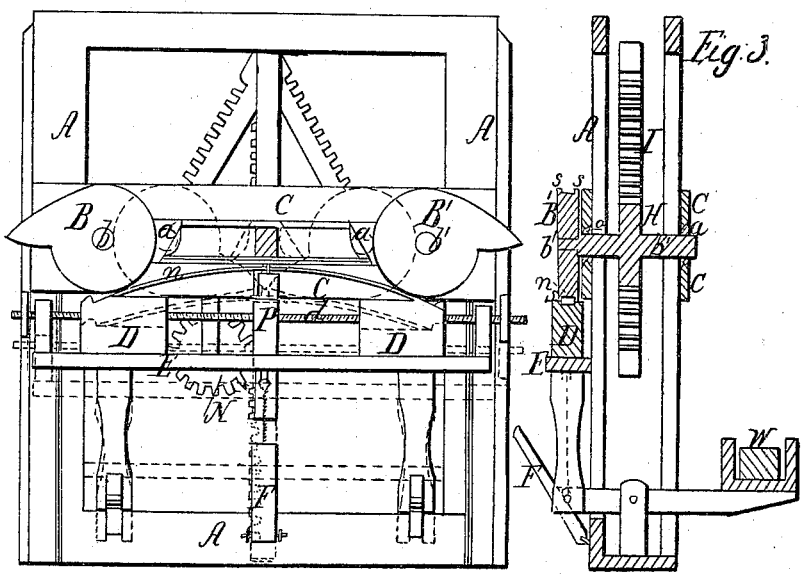
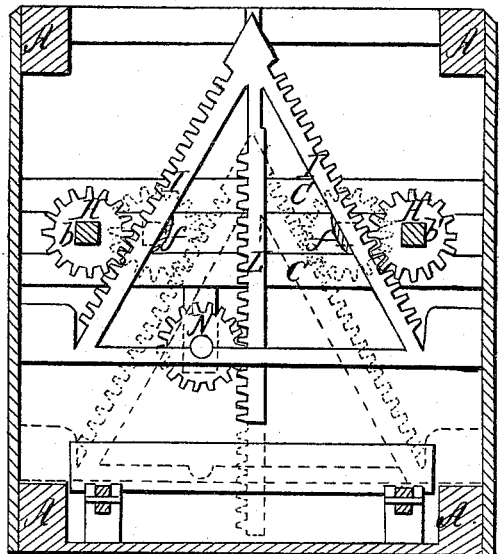
Witnesses
J. W. Shumway
A. J. Tibbits
Inventor,
William Harty.
By his Attorney
John E. Earle

United States Patent Office.

WILLIAM HARTY, OF BRIDGEPORT, CONNECTICUT.

Letters Patent No. 113,164, dated March 28, 1871; antedated March 20, 1871.

IMPROVEMENT IN MACHINES FOR FORMING CARRIAGE-SPRINGS.

The Schedule referred to in these Letters Patent and making part of the same.

*To all whom it may concern:*

Be it known that I, WILLIAM HARTY, of Bridgeport, in the county of Fairfield and State of Connecticut, have invented a new Improvement in Machine for Forming Carriage-Springs; and I do hereby declare the following, when taken in connection with the accompanying drawings and the letters of reference marked thereon, to be a full, clear, and exact description of the same, and which said drawings constitute part of this specification, and represent in—

Figure 1, a front view;
Figure 2, a sectional view; and
Figure 3, a section through one of the rolls.

This invention relates to an improvement in apparatus for forming carriage-springs; and It consists in the arrangement hereafter described, by means of which a combined rotating and reciprocating movement is imparted to the rolls.

A is the frame, which supports the operative mechanism.

B and B' are two cam-shaped rolls, one right hand and the other left, fixed respectively to their shafts b b'.

The bearing of the said shafts is arranged in slides a, working between guides C C, (see fig. 3,) so that the shafts may be moved toward or from each other as may be required.

D D are two heads, arranged upon a bed, E, and so as to travel toward or from each other by means of a threaded shaft, d, (may be one to each head, or a single shaft extending through both, with a right-and-left thread,) so that, by turning the said shaft, the two heads may be drawn asunder or be made to approach each other.

The bed E is arranged so as to move vertically up and down in suitable guideways on the frame, and may be drawn down by a treadle, F, and up by a weight, W, as seen in fig. 3.

On each of the shafts of the respective rolls is arranged a pinion, H, (see figs. 2 and 3,) and in connection therewith are arranged two equally-inclined racks, I, with a vertical rack, L, attached thereto.

The said racks I have a bearing, f, upon the carriages which support the shaft b, so that, as the racks are drawn down from the position in fig. 2 to that denoted in broken lines in same figure, the shafts b b' receive a rotary motion from the teeth of the racks working in the pinions H, and at the same time are caused to advance toward each other by the connection or bearing f, on the said racks, and the return of the racks in like manner forces the shafts asunder, thus imparting to the shafts a combined reciprocating and rotary movement.

The necessary movement is given to the racks by means of the pinion N, working in the vertical rack, as seen in fig. 2.

The form upon which the spring is rolled consists of a steel or iron plate, n, resting on the heads D D, and upon a central stud, P, which has a front or pin i extending through the center of the form.

The rolls being brought together, as denoted in broken lines, fig. 1, the spring is heated and placed between the rolls and former n, (the bed E being depressed to allow the introduction of the spring;) then the rolls bearing hard upon the spring are caused to revolve, and at the same time travel toward the end, binding the spring down into form in the most perfect manner.

To insure the straightening of the spring laterally I form a flange or edge, s, on each side of the roll, the face of the roll being the width of the spring, so that the spring, set at first between the flanges of the roll, will be guided therein to the extreme end, and thus insure not only the proper curvature, but perfectly straight edges.

The former n is used for making the first leaf or back of the spring.

When this first leaf has been formed it is taken from the machine and tempered, then the former n is taken out and the back leaf inserted, which serves to form the next leaf, and so on, each successive leaf serving as the former for the next, the two heads D being drawn together as the leaves shorten.

If preferred, the leaves may remain until all are formed.

I do not wish to be understood as broadly claiming the arrangement of a pair of rolls to operate in combination with the former to bend the springs, as such is not new.

I claim as my invention—

In combination, with the vertical rack L and its pinion N, the inclined racks I, with their respective pinions H arranged in bearings connected to said inclined racks, so that, by means of the said racks I, both a reciprocating and rotary movement is imparted to the pinions H.

WM. HARTY.

Witnesses:
JOHN H. SHUMWAY,
A. J. TIBBITS.